(12) United States Patent
Ramisetti et al.

(10) Patent No.: US 10,979,962 B2
(45) Date of Patent: Apr. 13, 2021

(54) WIRELESS SYSTEM CONFIGURATION OF MASTER ZONE DEVICES BASED ON SIGNAL STRENGTH ANALYSIS

(71) Applicant: Carrier Corporation, Palm Beach Gardens, FL (US)

(72) Inventors: Srinivas Ramisetti, Hyderabad (IN); Ravi Kumar Kandhi, Telangana (IN); Pradeep Kumar Gottumukkala, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/578,651

(22) Filed: Sep. 23, 2019

(65) Prior Publication Data

US 2020/0107241 A1    Apr. 2, 2020

(30) Foreign Application Priority Data

Oct. 2, 2018  (IN) .............................. 201811037187

(51) Int. Cl.
*H04W 84/20*    (2009.01)
*H04W 40/22*    (2009.01)
(Continued)

(52) U.S. Cl.
CPC .......... *H04W 40/22* (2013.01); *H04B 17/318* (2015.01); *H04W 8/005* (2013.01);
(Continued)

(58) Field of Classification Search
CPC ..... H04W 40/22; H04W 84/20; H04W 88/04; H04W 88/16; H04W 8/005; H04W 4/80;
(Continued)

(56) References Cited

U.S. PATENT DOCUMENTS 7,801,058 B2    9/2010    Wang
7,835,333 B2    11/2010   Park et al.
(Continued)

FOREIGN PATENT DOCUMENTS

| CN | 104684041 B | 6/2015 |
|---|---|---|
| CN | 106332213 A | 1/2017 |
| CN | 107787469 A | 3/2018 |

*Primary Examiner* — Philip Sobutka

(74) *Attorney, Agent, or Firm* — Cantor Colburn LLP

(57) ABSTRACT

A system and method for dynamic communication of wireless devices in a heating, ventilation, and air-conditioning (HVAC) system is provided. Aspects include receiving a mapping of a location comprising a plurality of zones having a plurality of devices in each zone, broadcasting a discovery signal to the plurality of devices in each zone, receiving a response signal from one or more devices in each zone, the response signal comprising a signal strength, analyzing the signal strength of each response signal to identify a master zone device based on the signal strength, and configuring the master zone device in each zone to broadcast a second (Continued)

discovery signal to the plurality of devices in a respective zone, the second discovery signal having instructions comprising a configuration for the each of the plurality of devices in the zone to broadcast device data to the respective master zone device.

20 Claims, 3 Drawing Sheets

(51) Int. Cl.
    *H04W 88/04*     (2009.01)
    *H04W 88/16*     (2009.01)
    *H04B 17/318*     (2015.01)
    *H04W 8/00*     (2009.01)

(52) U.S. Cl.
    CPC ............ *H04W 84/20* (2013.01); *H04W 88/04* (2013.01); *H04W 88/16* (2013.01)

(58) Field of Classification Search
    CPC ..... H04W 84/18; H04W 76/14; H04W 48/16; H04W 84/12; H04W 12/003; H04W 40/00; H04W 40/10; H04W 40/30; H04W 4/70; H04W 64/00; H04W 76/10; F24F 11/30; F24F 11/62; F24F 11/50; F24F 11/54; F24F 11/56; H04L 67/12; H04L 12/28
    USPC .......................................... 455/3.06
    See application file for complete search history.

(56) References Cited

U.S. PATENT DOCUMENTS

| | | |
|---|---|---|
| 7,944,883 B2 | 5/2011 | Orth |
| 8,185,653 B2 | 5/2012 | Yau et al. |
| 9,001,680 B2 | 4/2015 | Koskela et al. |
| 9,148,751 B2 | 9/2015 | Chen et al. |
| 9,426,616 B1 | 8/2016 | Rasband et al. |
| 9,485,649 B2 | 11/2016 | Citrano, III et al. |
| 9,639,100 B2 | 5/2017 | Storm et al. |
| 9,924,304 B2 | 3/2018 | Yu et al. |
| 9,924,342 B2 | 3/2018 | Logue et al. |
| 2011/0216695 A1 | 9/2011 | Orth |
| 2011/0261795 A1 | 10/2011 | Honegger et al. |
| 2014/0031990 A1 | 1/2014 | Filbeck |
| 2016/0165387 A1 | 6/2016 | Nhu |
| 2016/0327921 A1 | 11/2016 | Ribbich et al. |
| 2017/0111846 A1* | 4/2017 | Kang ................. H04W 40/244 |
| 2017/0176034 A1 | 6/2017 | Hussain et al. |
| 2017/0347229 A1 | 11/2017 | Kwon |
| 2018/0109993 A1 | 4/2018 | Kwan et al. |
| 2018/0132183 A1 | 5/2018 | Gattu |
| 2018/0332434 A1* | 11/2018 | Kulkarni ................. H04W 4/35 |

\* cited by examiner

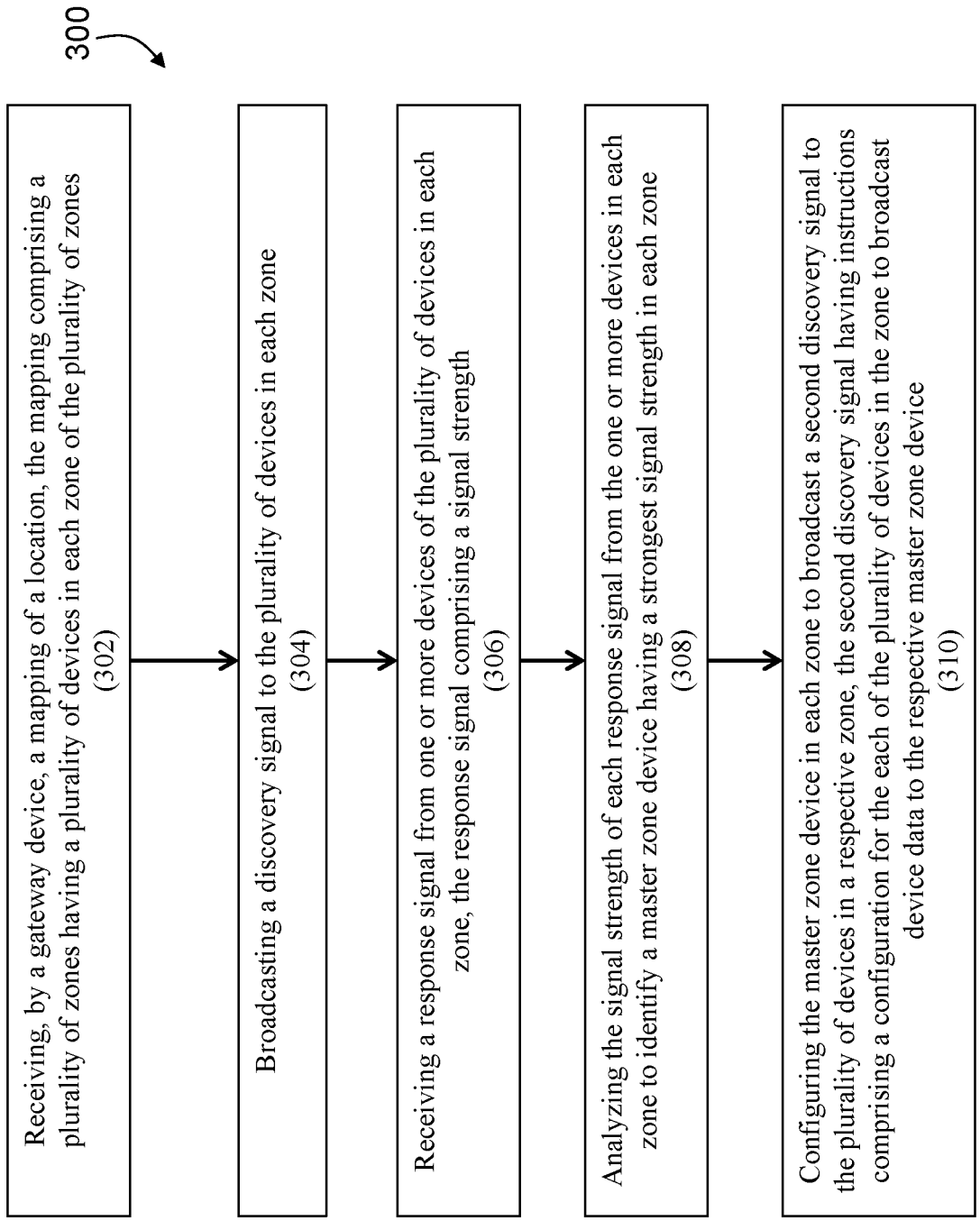

WIRELESS SYSTEM CONFIGURATION OF MASTER ZONE DEVICES BASED ON SIGNAL STRENGTH ANALYSIS

CROSS-REFERENCE TO RELATED APPLICATIONS

This application claims the benefit of Indian Provisional Application No. 201811037187 filed Oct. 2, 2018, which is incorporated herein by reference in its entirety.

BACKGROUND

Exemplary embodiments pertain to the art of HVAC systems and more specifically to dynamic communication of wireless devices in HVAC systems.

In heating, ventilation, and air-conditioning (HVAC) systems, wireless sensing devices can be located remotely from a thermostat and connect to the thermostat through a wireless network. However, certain buildings, such as large residential homes, can have a thermostat located at a convenient location to the occupant but be installed out of range of certain wireless sensing devices within the building. In addition, the sensing device (e.g., temperature, humidity, etc.) can have limited range due to the sensing devices being battery powered. And, attempting to further the range by boosting a transmission signal strength can reduce battery life of the devices.

BRIEF DESCRIPTION

Disclosed is a system. The system includes a gateway device including a processor and a transceiver, the gateway device configured to receive a mapping of a location, the mapping including a plurality of zones having a plurality of devices in each zone of the plurality of zones, broadcast a discovery signal to the plurality of devices in each zone, receive a response signal from one or more of the plurality of devices in each zone, the response signal comprising a signal strength, analyze the signal strength of each response signal from the one or more devices in each zone to identify a master zone device based at least in part on the signal strength, and configure the master zone device in each zone to broadcast a second discovery signal to the plurality of devices in a respective zone, the second discovery signal having instructions including a configuration for the each of the plurality of devices in the zone to broadcast device data to the respective master zone device.

In addition to one or more of the features described above, or as an alternative, further embodiments of the system may include that the gateway device is further configured to receive, from each of the master zone devices, device data from each of the plurality of devices in each zone of the plurality of zones.

In addition to one or more of the features described above, or as an alternative, further embodiments of the system may include that the plurality of devices comprises sensors configured to measure environmental conditions.

In addition to one or more of the features described above, or as an alternative, further embodiments of the system may include that the gateway device includes a thermostat.

In addition to one or more of the features described above, or as an alternative, further embodiments of the system may include that the instructions further include a second configuration for each the plurality of devices to reduce a signal strength based on a proximity to the respective master zone device.

In addition to one or more of the features described above, or as an alternative, further embodiments of the system may include that the gateway device is further configured to receive a confirmation signal from the master zone device in each zone identifying each device in the plurality of devices transmitting to the respective master zone device.

In addition to one or more of the features described above, or as an alternative, further embodiments of the system may include that the gateway device is further configured to compare the confirmation signal to the mapping of the location to determine an out-of-range zone, wherein the out-of-range zone does not include a master zone device, identify a nearest master zone device to the out-of-range zone based at least in part on the mapping of the location, and configure the nearest master zone device to broadcast a third discovery signal to the out-of-range zone, receive a second response signal from the plurality of devices in the out-of-range zone, the second response signal comprising a second signal strength, analyze the second signal strength to identify an out-of-range master zone device having a strongest second signal strength in the out-of-range zone, configure the out-of-range master zone device in the out-of-range zone to broadcast a fourth discovery signal to the plurality of devices in the out-of-range zone, the fourth discovery signal having second instructions comprising a configuration for each of the plurality of devices in the out-of-range zone to broadcast device data to the out-of-range master zone device, and transmit, to the gateway device, device data from at least one of the plurality of devices in the out-of-range zone.

In addition to one or more of the features described above, or as an alternative, further embodiments of the system may include that the gateway device is further configured to receive, from the nearest master zone device, device data from at least one of the plurality of devices in the out-of-range zone.

In addition to one or more of the features described above, or as an alternative, further embodiments of the system may include that the gateway device is further configured to store the signal strength for the one or more devices of the plurality of devices in each zone in a memory.

In addition to one or more of the features described above, or as an alternative, further embodiments of the system may include that the gateway device is further configured to periodically broadcast a quality-check discovery signal to the plurality of devices in each zone, receive a quality-check response signal from one or more devices of the plurality of devices in each zone, the quality-check response signal comprising a second signal strength, and determine a new master zone device for a zone based on the second signal strength being stronger than the signal strength for the zone.

Disclosed is a method for dynamic communication of wireless devices. The method includes receiving, by a gateway device, a mapping of a location, the mapping comprising a plurality of zones having a plurality of devices in each zone of the plurality of zones, broadcasting a discovery signal to the plurality of devices in each zone, receiving a response signal from one or more devices of the plurality of devices in each zone, the response signal comprising a signal strength, analyzing the signal strength of each response signal from the one or more devices in each zone to identify a master zone device based at least in part on the signal strength, and configuring the master zone device in each zone to broadcast a second discovery signal to the plurality of devices in a respective zone, the second discovery signal having instructions including a configuration for the each of the plurality of devices in the zone to broadcast device data to the respective master zone device.

In addition to one or more of the features described above, or as an alternative, further embodiments of the method may include receiving, from each of the master zone devices, device data from each of the plurality of devices in each zone of the plurality of zones.

In addition to one or more of the features described above, or as an alternative, further embodiments of the method may include that the plurality of devices include sensors configured to measure environmental conditions.

In addition to one or more of the features described above, or as an alternative, further embodiments of the method may include that the gateway device includes a thermostat.

In addition to one or more of the features described above, or as an alternative, further embodiments of the method may include that the instructions further include a second configuration for each the plurality of devices to reduce a signal strength based on a proximity to the respective master zone device.

In addition to one or more of the features described above, or as an alternative, further embodiments of the method may include receiving a confirmation signal from the master zone device in each zone identifying each device in the plurality of devices transmitting to the respective master zone device.

In addition to one or more of the features described above, or as an alternative, further embodiments of the method may include comparing the confirmation signal to the mapping of the location to determine an out-of-range zone, wherein the out-of-range zone does not include a master zone device, identify a nearest master zone device to the out-of-range zone based at least in part on the mapping of the location, and configure the nearest master zone device to broadcast a third discovery signal to the out-of-range zone, receive a second response signal from the plurality of devices in the out-of-range zone, the second response signal including a second signal strength, analyze the second signal strength to identify an out-of-range master zone device having a strongest second signal strength in the out-of-range zone, configure the out-of-range master zone device in the out-of-range zone to broadcast a fourth discovery signal to the plurality of devices in the out-of-range zone, the fourth discovery signal having second instructions comprising a configuration for each of the plurality of devices in the out-of-range zone to broadcast device data to the out-of-range master zone device, and transmit, to the gateway device, device data from at least one of the plurality of devices in the out-of-range zone.

In addition to one or more of the features described above, or as an alternative, further embodiments of the method may include receiving, from the nearest master zone device, device data from at least one of the plurality of devices in the out-of-range zone.

In addition to one or more of the features described above, or as an alternative, further embodiments of the method may include storing the signal strength for the one or more devices of the plurality of devices in each zone in a memory.

In addition to one or more of the features described above, or as an alternative, further embodiments of the method may include periodically broadcasting a quality-check discovery signal to the plurality of devices in each zone, receiving a quality-check response signal from one or more devices of the plurality of devices in each zone, the quality-check response signal comprising a second signal strength, and determining a new master zone device for a zone based on the second signal strength being stronger than the signal strength for the zone.

BRIEF DESCRIPTION OF THE DRAWINGS

The following descriptions should not be considered limiting in any way. With reference to the accompanying drawings, like elements are numbered alike:

FIG. 3 depicts a flow diagram of a method for dynamic communication of wireless devices according to one or more embodiments.

The diagrams depicted herein are illustrative. There can be many variations to the diagram or the operations described therein without departing from the spirit of the disclosure. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Figure 1:
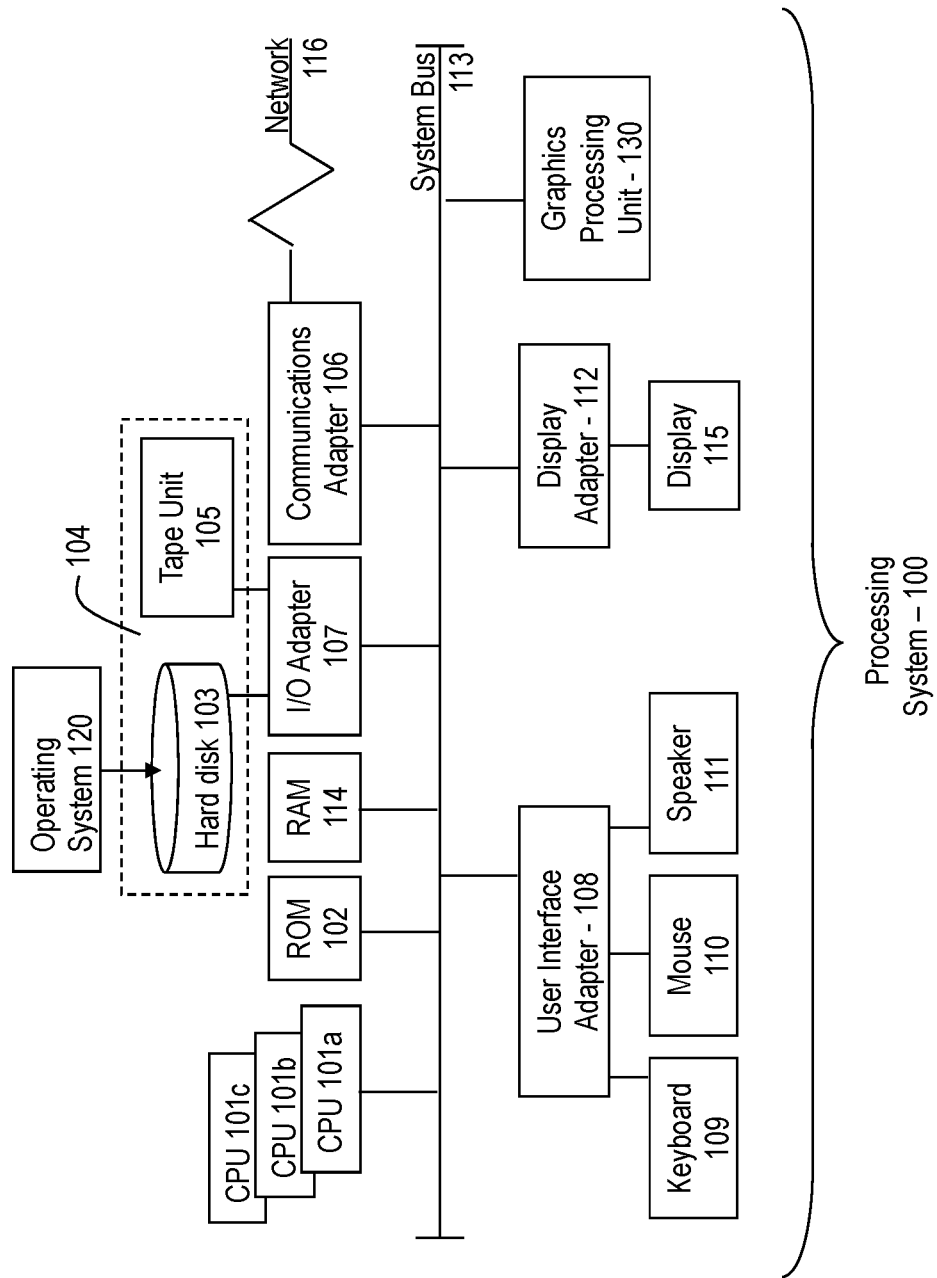
FIG. 1 depicts a block diagram of a computer system for use in implementing one or more embodiments.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system coordinate the functions of the various components shown in FIG. 1.

Turning now to an overview of technologies that are more specifically relevant to aspects of the disclosure, in a wireless sensor environment, communication is restricted by distance, obstacles, power transmission, and the like which may cause frequent communication loss between the wireless sensor device and a receiver resulting in poor performance. Particularly, thermostat devices communicate with wireless temperature and humidity sensors that transmit sensor data to the thermostat in a heating, ventilation, and air-conditioning (HVAC) system. In larger buildings, the sensor installation can be limited to wireless communication ranges and hence zone sensors cannot be installed outside the wireless range of a thermostat. For zones that are located a considerable distance from the thermostat, more power is required to communication which can result in a larger battery drain on the wireless sensor. In addition, the broadcasting of sensor data across the larger distance allows for interference from other devices and makes the broadcast more susceptible to noise.

Turning now to an overview of the aspects of the disclosure, one or more embodiments address the above-described shortcomings of the prior art by providing a thermostat that dynamically identifies a sensor device having a strong signal in a designated zone within a location. These sensor devices having the strong signal can be designated as a master zone device within its respective zone. The remaining sensor devices can be configured to transmit the sensor data collected in the respective zone to the master zone device which can transmit that collected sensor data to the thermostat. For specific zones having no device within range of the wireless signal of the thermostat, the nearest master zone device can then "discover" a device in the out-of-range zone that has the strongest signal and designate this device as the master zone device in the out-of-range zone. This discovery process is determined by the thermostat operating the nearest master zone device. The thermostat requests zone masters to find the devices in the out-of-range zone. All the zone masters perform a scan and transmit data back to the thermostat. The thermostat then determines the out-of-range zone maters and also the zone master nearest to the out-of-range zone master. Also, the nearest zone master is configured to collect sensor data from the out-of-range master zone device and relays this sensor data back to the thermostat. This out-of-range master zone device can collect sensor data from the other sensors within the out-of-range zone. The nearest master zone device collects the sensor data and relays it back to the thermostat. This dynamic configuration can extend the wireless sensor communication range for larger facilities and can also reconfigure the master zone device dynamically if any of the wireless sensing device malfunction or go offline.

Figure 2:
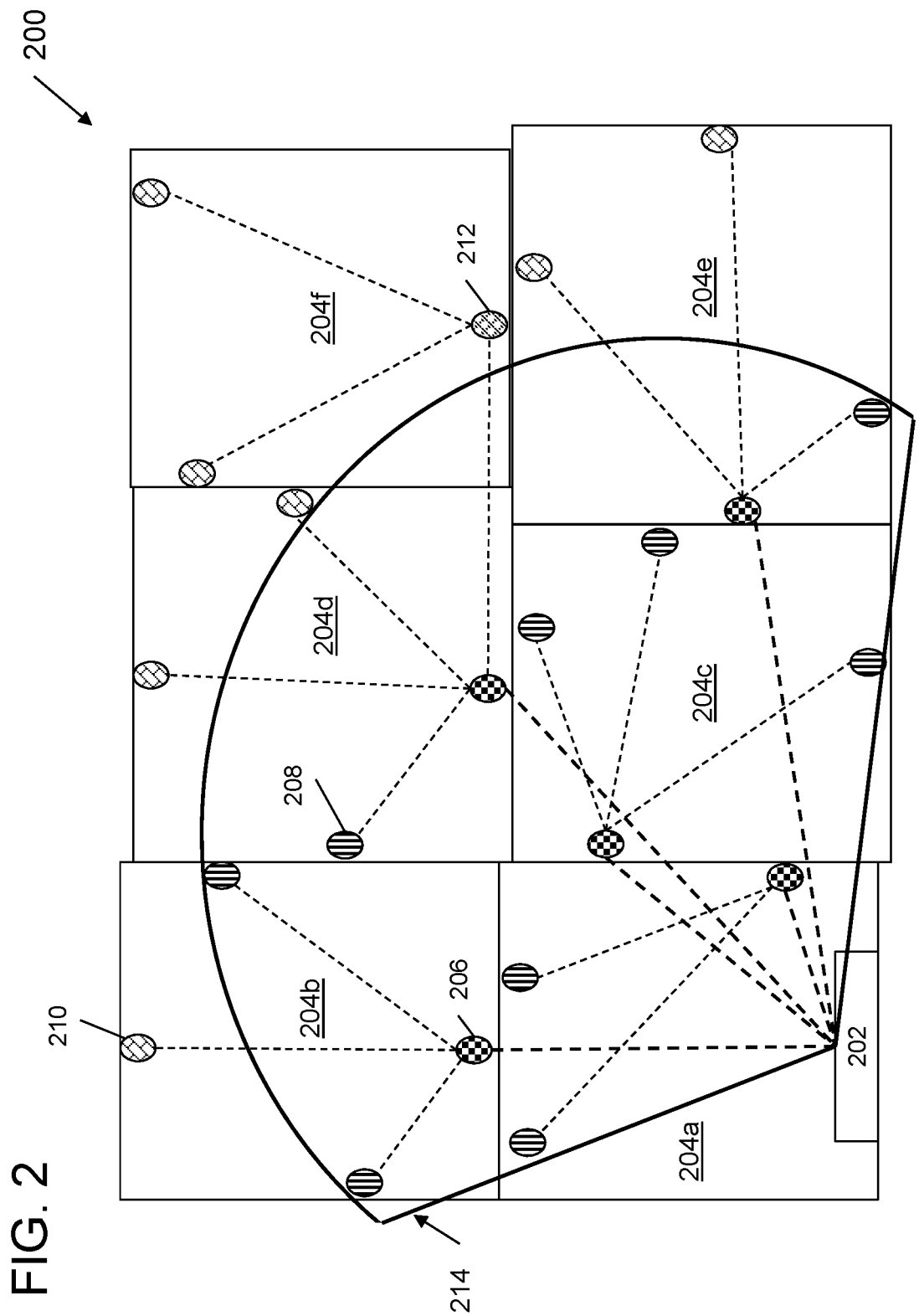
FIG. 2 depicts a system for dynamic communication of wireless devices according to embodiments.

Turning now to a more detailed description of aspects of the present disclosure, FIG. 2 depicts a system for dynamic communication of wireless devices according to embodiments. The system 200 includes a thermostat 202 and a plurality of wireless sensor devices 206, 208, 210, 212 that are distributed throughout various zones 204a-f of a location. The thermostat 202 has a wireless communication range 214 that covers portions of the different zones 204a-f. In embodiments, the wireless communication range 214 may only cover portions of the zones 204a-f and thus some of the devices are out-of-range sensor devices 210, 212 outside the wireless communication range 214. These out-of-range sensor devices 210, 212 can still be in range of the other wireless sensor devices 206, 208 within their respective zones 204a-f.

In one or more embodiments, the thermostat 202 can be implemented on the processing system 100 found in FIG. 1. Additionally, a cloud computing system can be in wired or wireless electronic communication with one or all of the elements of the system 200. Cloud can supplement, support or replace some or all of the functionality of the elements of the system 200. Additionally, some or all of the functionality of the elements of system 200 can be implemented as a node of a cloud. The cloud computing described herein is only one example of a suitable cloud computing environment and is not intended to suggest any limitation as to the scope of use or functionality of embodiments described herein.

In one or more embodiments, the thermostat 202 can connect to each of the wireless sensor devices 206, 208, 210, 212 by broadcasting a discovery signal. The wireless sensor devices 206, 208 within the communication range 214 can respond with a response or acknowledgement signal to the thermostat 202. The signal strength of the response signal can be analyzed by the thermostat 202 to identify a master zone sensor device 206 for each device. The thermostat 202 selects the master zone sensor device 206 based on the highest signal strength from the corresponding zone 204a-f. In one or more embodiments, each zone 204a-f has one master zone sensor device 206. In other embodiments, multiple master zone sensor devices can be located in a corresponding zone. In embodiments, when the master zone sensor device 206 is identified for each zone, the thermostat 202 can transmit configuration instructions to the master zone device 206 to pass along to the wireless sensor devices 208, 210 within the corresponding zone 204a-f. These configuration instructions allow for the wireless sensor devices 208, 210 within the corresponding zones 204a-f to transmit collected sensor data to the master zone sensor device 206. The master zone sensor device 206, having the strongest signal, can transmit the collected sensor data to the thermostat 202.

In one or more embodiments, the thermostat 202 can include a mapping of each of the wireless sensor devices 206, 208, 210, 212 in each of their respective zones 204a-f. After broadcasting the discovery signal to the wireless sensor devices 206, 208, 210, 212, the acknowledgements received by the thermostat 202 can include a zone designation so that the thermostat 202 can select the wireless device 206 having the strongest signal in each corresponding zone 204a-f for designation as the master zone sensor device 206. This allows for one master zone device 206 per zone 204a-f.

In one or more embodiments, after designating the master zone sensor devices in the respective zones 204a-f, the thermostat 202 can determine if there are any zones 204a-f with no master zone sensor device designated (e.g., zone 204O). If there exists a zone with no master zone sensor device designated, the thermostat 202 can identify a nearest master zone sensor device 206 to the out-of-range zone (e.g., 2040 to broadcast a discovery signal and identify a wireless sensing device 210, 212 having a strongest signal (based on an acknowledgement signal received by the nearest master zone sensor device 206). The out-of-range wireless sensing device with the strongest signal 212 as it relates to the nearest wireless sensing device can be designated as an out-of-range master zone sensing device 212 and can be configured to transmit the sensor data collected from the wireless sensing devices in the corresponding zone to the nearest master zone sensing device 206. The nearest master zone sensing device 206 can then transmit the sensor data to the thermostat 202.

In one or more embodiments, the wireless sensing devices 206, 208, 210, 212 can be battery or non-battery powered devices that utilize BLUETOOTH™ low energy (BLE) technology that can connect to wireless area networks. The wireless sensing devices 206, 208, 210, 212 can be temperature or humidity sensors that are configured to collect temperature or humidity data and transmit this data to the thermostat 202. In other embodiments, the wireless sensing devices 206, 208, 210, 212 can be any type of Internet of Things (IoT) device that are capable of communicating over a wired or wireless network through a gateway device, such as the thermostat 202. In embodiments, the wireless sensing devices 206, 208, 210, 212 can be battery powered and have an operational life dependent on the life of the battery powering the devices. To conserve battery power, the wireless sensing devices 206, 208, 210, 212 can be configured to reduce their signal broadcast strength (power) when a master zone sensing device 206 is designated. Because the wireless sensing devices are closer to the receiver of their sensor data transmissions, the signal strength (power) can be reduced without the risk of data loss or signal loss because the master zone sensing devices 206 are typically closer to the devices than the thermostat 202, especially in remote zones of a building.

In one or more embodiments, an optimization algorithm can be utilized to designate and re-designate master zone sensing devices 206 within a zone based on changes to the signal strength of the wireless sensing devices 206, 208, 210, 212 in each zone. The thermostat 202 can periodically broadcast a new discovery signal to identify a new wireless sensing device that may have a stronger signal based on conditions such as battery power and the like. The thermostat 202 can update the master zone sensing device designation in each zone. In embodiments, the new broadcast signal can be performed periodically or can be performed based on a user-input. The master zone sensing device in each zone can have an additional power draw due to the need to transmit the sensor data to the thermostat 202 which may be a further distance than the other wireless sensing devices need to transmit. Because of this additional power, the thermostat 202 can alternate between wireless sensing devices for the master zone sensing device to save battery power among the wireless sensing devices in each zone. For example, during discovery, thermostat 202 can rank the signal strength of each wireless sensing device and alternate between devices with signal strengths above a threshold signal strength to have as a master zone sensing device. This allows for the conservation of battery power as the wireless sensing devices can have a limited amount of time acting as the master zone sensing device and be included in the wireless sensing devices using lower power signal transmissions within the zone.

In one or more embodiments, the thermostat 202 can periodically broadcast a quality-check discovery signal to check the signal strength of each master zone device in each zone as well as the other wireless sensing devices. Should the master zone device signal strength fall below the signal strength of another wireless sensing device within the corresponding zone, a new master zone sensing device can be designated. In embodiments, the quality check discovery signal can be triggered by a user input or could be triggered by the thermostat 202 when invalid, incomplete, or noisy sensor data is received from a master zone device.

In one or more embodiments, the discovery signals from the thermostat 202 can utilize credentialing techniques to connect to each wireless sensing device by providing login credentials to a wireless network provided by the thermostat 202 and having the wireless devices connecting to the wireless network using the login credentials.

In one or more embodiments, the thermostat 202 can be a gateway device including a panel for a home controlling system. For example, the panel can be used to operate IoT devices (e.g., wireless sensing devices or other devices) such as electronic locks, indoor and outdoor lighting, appliances, and the like. Each of the IoT devices can connect to the wireless network through the systems and methodology described herein.

In embodiments, the wireless sensing devices 206, 208, 210, 212 are wireless and include an addressable interface that can connect to a network. In most cases, connecting an IoT device to a wireless network involves the manual input of a passcode or a network name or a service set identifier (SSID). Also, this sometimes will need to be performed while the system is in a discovery mode. The term Internet of Things (IoT) object is used herein to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other objects over a wired or wireless connection. An IoT object may have a passive communication interface, such as a quick response (QR) code, a radio-frequency identification (RFID) tag, an NFC tag, or the like, or an active communication interface, such as a modem, a transceiver, a transmitter-receiver, or the like. An IoT object can have a particular set of attributes (e.g., a device state or status, such as whether the IoT object is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT objects may include, but are not limited to, refrigerators, toasters, ovens, microwaves, freezers, dishwashers, dishes, hand tools, clothes washers, clothes dryers, furnaces, heating, ventilation, air conditioning & refrigeration (HVACR) systems, air conditioners, thermostats, fire alarm & protection system, fire, smoke & CO detectors, access/video security system, elevator and escalator systems, burner and boiler controls, building management controls, televisions, light fixtures, vacuum cleaners, sprinklers, electricity meters, gas meters, etc., so long as the devices are equipped with an addressable communications interface for communicating with the IoT network. IoT objects may also include cell phones, desktop computers, laptop computers, tablet computers, personal digital assistants (PDAs), etc. Accordingly, the IoT network can include a combination of "legacy" Internet-accessible devices (e.g., laptop or desktop computers, cell phones, etc.) in addition to devices that do not typically have Internet-connectivity (e.g., dishwashers, etc.).

FIG. 3 depicts a flow diagram of a method for dynamic communication of wireless devices according to one or more embodiments. The method 300 includes receiving, by a gateway device, a mapping of a location, the mapping comprising a plurality of zones having a plurality of devices in each zone of the plurality of zones, as shown in block 302. At block 304, the method 300 includes broadcasting a discovery signal to the plurality of devices in each zone. And the method 300, at block 306, includes receiving a response signal from one or more devices of the plurality of devices in each zone, the response signal comprising a signal strength. The method 300 also includes analyzing the signal strength of each response signal from the one or more devices in each zone to identify a master zone device having a strongest signal strength in each zone, as shown at block 308. And at block 310, the method 300 includes configuring the master zone device in each zone to broadcast a second discovery signal to the plurality of devices in a respective zone, the second discovery signal having instructions comprising a configuration for the each of the plurality of devices in the zone to broadcast device data to the respective master zone device.

Additional processes may also be included. It should be understood that the processes depicted in FIG. 3 represent illustrations and that other processes may be added or existing processes may be removed, modified, or rearranged without departing from the scope and spirit of the present disclosure.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
a gateway device comprising a processor and a transceiver, the gateway device configured to:
receive a mapping of a location, the mapping comprising a plurality of zones having a plurality of devices in each zone of the plurality of zones;
broadcast a discovery signal to the plurality of devices in each zone;
receive a response signal from one or more of the plurality of devices in each zone, the response signal comprising a signal strength;
analyze the signal strength of each response signal from the one or more devices in each zone to identify a master zone device based at least in part on the signal strength; and
configure the master zone device in each zone to broadcast a second discovery signal to the plurality of devices in a respective zone, the second discovery signal having instructions comprising a configuration for the each of the plurality of devices in the zone to broadcast device data to the respective master zone device;
the master zone device configured to collect data from out-of-range devices that are outside a wireless communication range of the gateway, the master zone device configured to transmit data from the out-of-range devices to the gateway.

2. The system of claim 1, wherein the gateway device is further configured to receive, from each of the master zone devices, device data from each of the plurality of devices in each zone of the plurality of zones.

3. The system of claim 1, wherein the plurality of devices comprises sensors configured to measure environmental conditions.

4. The system of claim 1, wherein the gateway device comprises a thermostat.

5. The system of claim 1, wherein the instructions further comprise a second configuration for each the plurality of devices to reduce a signal strength based on a proximity to the respective master zone device.

6. The system of claim 1, wherein the gateway device is further configured to receive a confirmation signal from the master zone device in each zone identifying each device in the plurality of devices transmitting to the respective master zone device.

7. A system comprising:
a gateway device comprising a processor and a transceiver, the gateway device configured to:
receive a mapping of a location, the mapping comprising a plurality of zones having a plurality of devices in each zone of the plurality of zones;
broadcast a discovery signal to the plurality of devices in each zone;
receive a response signal from one or more of the plurality of devices in each zone, the response signal comprising a signal strength;
analyze the signal strength of each response signal from the one or more devices in each zone to identify a master zone device based at least in part on the signal strength; and
configure the master zone device in each zone to broadcast a second discovery signal to the plurality of devices in a respective zone, the second discovery signal having instructions comprising a configuration for the each of the plurality of devices in the zone to broadcast device data to the respective master zone device;

wherein the gateway device is further configured to receive a confirmation signal from the master zone device in each zone identifying each device in the plurality of devices transmitting to the respective master zone device;

wherein the gateway device is further configured to:

compare the confirmation signal to the mapping of the location to determine an out-of-range zone, wherein the out-of-range zone does not include a master zone device;

identify a nearest master zone device to the out-of-range zone based at least in part on the mapping of the location;

configure the nearest master zone device to:
broadcast a third discovery signal to the out-of-range zone;
receive a second response signal from the plurality of devices in the out-of-range zone, the second response signal comprising a second signal strength;
analyze the second signal strength to identify an out-of-range master zone device having a strongest second signal strength in the out-of-range zone;
configure the out-of-range master zone device in the out-of-range zone to broadcast a fourth discovery signal to the plurality of devices in the out-of-range zone, the fourth discovery signal having second instructions comprising a configuration for each of the plurality of devices in the out-of-range zone to broadcast device data to the out-of-range master zone device; and
transmit, to the gateway device, device data from at least one of the plurality of devices in the out-of-range zone.

8. The system of claim 7, wherein the gateway device is further configured to receive, from the nearest master zone device, device data from at least one of the plurality of devices in the out-of-range zone.

9. The system of claim 1, wherein the gateway device is further configured to:
store the signal strength for the one or more devices of the plurality of devices in each zone in a memory.

10. The system of claim 9, wherein the gateway device is further configured to:
periodically broadcast a quality-check discovery signal to the plurality of devices in each zone;
receive a quality-check response signal from one or more devices of the plurality of devices in each zone, the quality-check response signal comprising a second signal strength;
determine a new master zone device for a zone based on the second signal strength being stronger than the signal strength for the zone.

11. A method comprising:
receiving, by a gateway device, a mapping of a location, the mapping comprising a plurality of zones having a plurality of devices in each zone of the plurality of zones;
broadcasting a discovery signal to the plurality of devices in each zone;
receiving a response signal from one or more devices of the plurality of devices in each zone, the response signal comprising a signal strength;
analyzing the signal strength of each response signal from the one or more devices in each zone to identify a master zone device based at least in part on the signal strength; and
configuring the master zone device in each zone to broadcast a second discovery signal to the plurality of devices in a respective zone, the second discovery signal having instructions comprising a configuration for the each of the plurality of devices in the zone to broadcast device data to the respective master zone device;
configuring the master zone device to collect data from out-of-range devices that are outside a wireless communication range of the gateway and transmit data from the out-of-range devices to the gateway.

12. The method of claim 11, further comprising receiving, from each of the master zone devices, device data from each of the plurality of devices in each zone of the plurality of zones.

13. The method of claim 11, wherein the plurality of devices comprise sensors configured to measure environmental conditions.

14. The method of claim 11, wherein the gateway device comprises a thermostat.

15. The method of claim 11, wherein the instructions further comprise a second configuration for each the plurality of devices to reduce a signal strength based on a proximity to the respective master zone device.

16. The method of claim 11, further comprising receiving a confirmation signal from the master zone device in each zone identifying each device in the plurality of devices transmitting to the respective master zone device.

17. A method comprising:
receiving, by a gateway device, a mapping of a location, the mapping comprising a plurality of zones having a plurality of devices in each zone of the plurality of zones;
broadcasting a discovery signal to the plurality of devices in each zone;
receiving a response signal from one or more devices of the plurality of devices in each zone, the response signal comprising a signal strength;
analyzing the signal strength of each response signal from the one or more devices in each zone to identify a master zone device based at least in part on the signal strength; and
configuring the master zone device in each zone to broadcast a second discovery signal to the plurality of devices in a respective zone, the second discovery signal having instructions comprising a configuration for the each of the plurality of devices in the zone to broadcast device data to the respective master zone device;
receiving a confirmation signal from the master zone device in each zone identifying each device in the plurality of devices transmitting to the respective master zone device;
comparing the confirmation signal to the mapping of the location to determine an out-of-range zone, wherein the out-of-range zone does not include a master zone device;
identifying a nearest master zone device to the out-of-range zone based at least in part on the mapping of the location;
configuring the nearest master zone device to:
broadcast a third discovery signal to the out-of-range zone;

receive a second response signal from the plurality of devices in the out-of-range zone, the second response signal comprising a second signal strength;

analyze the second signal strength to identify an out-of-range master zone device having a strongest second signal strength in the out-of-range zone;

configure the out-of-range master zone device in the out-of-range zone to broadcast a fourth discovery signal to the plurality of devices in the out-of-range zone, the fourth discovery signal having second instructions comprising a configuration for each of the plurality of devices in the out-of-range zone to broadcast device data to the out-of-range master zone device; and transmit, to the gateway device, device data from at least one of the plurality of devices in the out-of-range zone.

18. The method of claim 17, further comprising receiving, from the nearest master zone device, device data from at least one of the plurality of devices in the out-of-range zone.

19. The method of claim 11, further comprising storing the signal strength for the one or more devices of the plurality of devices in each zone in a memory.

20. The method of claim 19, further comprising:
periodically broadcasting a quality-check discovery signal to the plurality of devices in each zone;
receiving a quality-check response signal from one or more devices of the plurality of devices in each zone, the quality-check response signal comprising a second signal strength;
determining a new master zone device for a zone based on the second signal strength being stronger than the signal strength for the zone.

* * * * *